United States Patent (10) Patent No.: US 8,078,746 B2
Asami et al. (45) Date of Patent: Dec. 13, 2011

(54) MOBILE TERMINAL, CONTENTS DELIVERY SYSTEM, AND CONTENTS REPRODUCTION PROGRAM

(75) Inventors: Satoshi Asami, Chiba (JP); Masashi Kokubo, Tokyo (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 1122 days.

(21) Appl. No.: 11/474,997

(22) Filed: Jun. 27, 2006

(65) Prior Publication Data

US 2007/0006317 A1 Jan. 4, 2007

(30) Foreign Application Priority Data

Jul. 4, 2005 (JP) ................................. 2005-195256

(51) Int. Cl.
*G06F 15/16* (2006.01)

(52) U.S. Cl. .................... 709/231; 709/236; 375/240
(58) Field of Classification Search ............... 455/550.1; 709/231
See application file for complete search history.

(56) References Cited

U.S. PATENT DOCUMENTS

2003/0081671 A1* 5/2003 Ishida et al. ................. 375/240

FOREIGN PATENT DOCUMENTS

EP 1 306 992 A2 5/2003
JP 2005-020312 A 1/2005

OTHER PUBLICATIONS

Extended European Search Report issued Sep. 21, 2009 for corresponding European Application No. 06 11 6552.

* cited by examiner

*Primary Examiner* — Charles Appiah
*Assistant Examiner* — Mazda Sabouri
(74) *Attorney, Agent, or Firm* — Rader, Fishman & Grauer PLLC

(57) ABSTRACT

Low bit rate contents data as pre-data corresponding to a series of stream data are preliminarily stored in a mobile phone. In order to reproduce certain contents, a transmission request of a high bit rate contents data block having the same contents as those of the low bit rate contents data block is transmitted to the delivery source indicated by the transfer source information added to the pre-data upon reproduction thereof. If the high bit rate contents data block is received from the delivery source, the high bit rate contents data block is reproduced. Meanwhile, if the high bit rate contents data block is unreceived from the delivery source, the low bit rate contents data block having the same contents as those of the high bit rate contents data block is detected from the pre-data so as to be reproduced in place thereof.

6 Claims, 13 Drawing Sheets

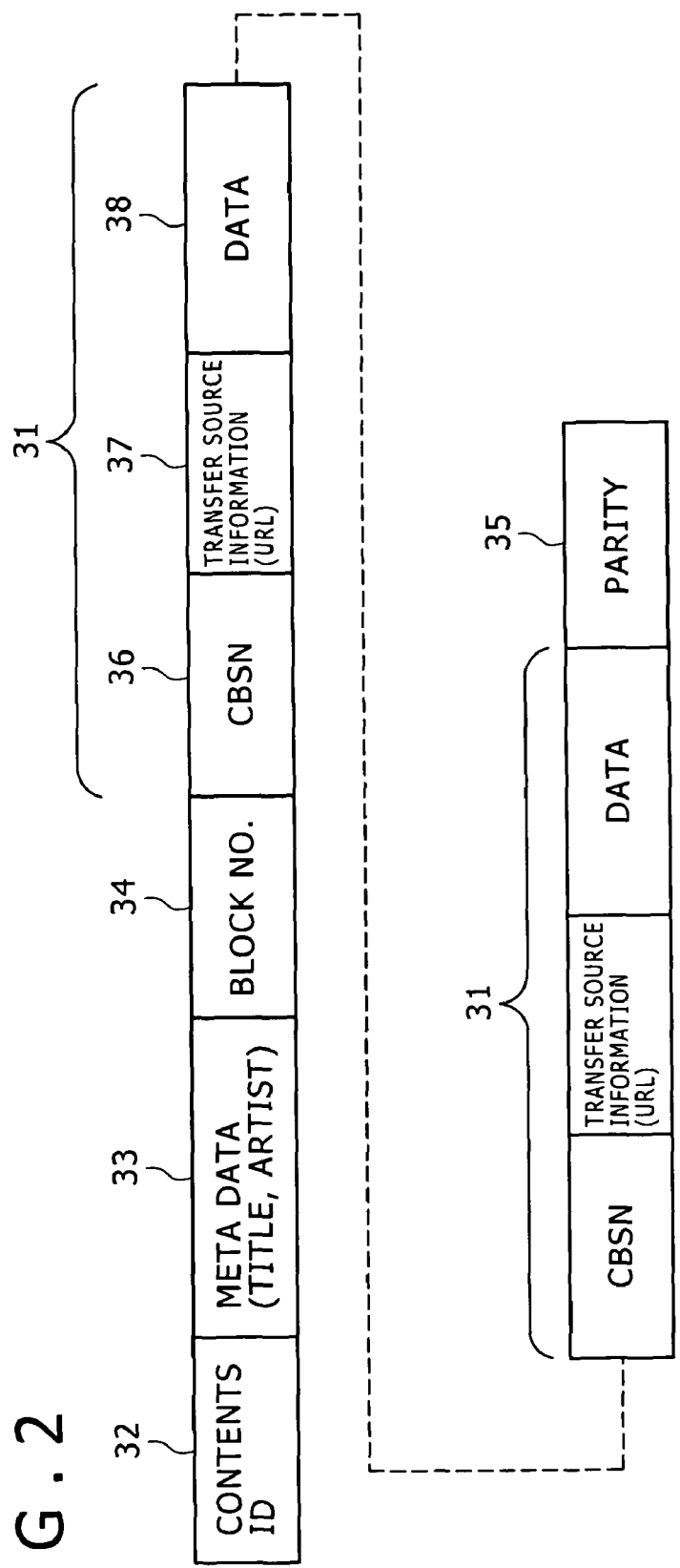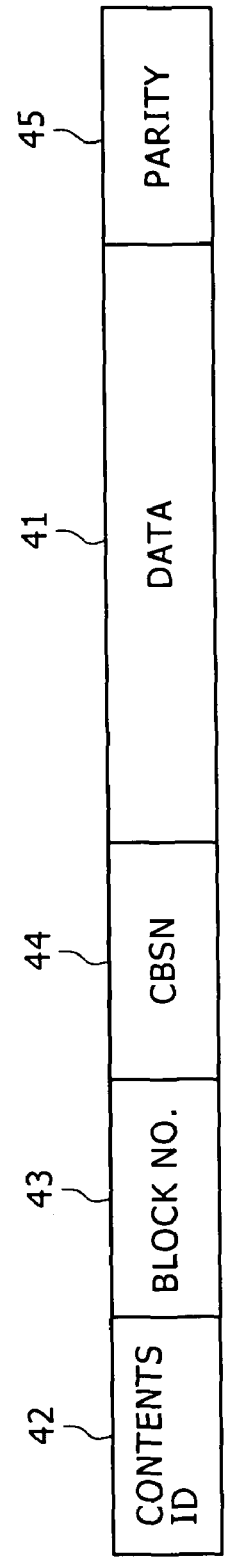

US 8,078,746 B2

MOBILE TERMINAL, CONTENTS DELIVERY SYSTEM, AND CONTENTS REPRODUCTION PROGRAM

CROSS REFERENCES TO RELATED APPLICATIONS

The present invention contains subject matter related to Japanese Patent Application JP 2005-195256 filed in the Japanese Patent Office on Jul. 4, 2005, the entire contents of which being incorporated herein by reference.

BACKGROUND OF THE INVENTION

1. Field of the Invention

The present invention relates to a mobile terminal, a contents delivery system, and a contents reproduction program which allow the mobile terminal to receive contents in good condition in the case where the communication quality is deteriorated during the contents delivery service using the terminal, for example, a portable phone, a PHS (Personal Handyphone System), a PDA (Personal Digital Assistant) unit equipped with a radio communication function, and a notebook PC.

2. Related Art

The contents delivery service provided through the mobile phone for distributing such contents as movie and music has been well known. Today, in order to cope with the demand for the delivery of the contents data with higher quality, the size of the contents data to be delivered has been increased.

When the user of the mobile phone moves to a place where the communication environment is not well-organized, the communication quality of the mobile phone is likely to be deteriorated. In the case where the access from a large number of users concentrates on a single radio base station, the communication band allocated for each user is reduced, thus degrading the communication quality. Despite the improved quality of the contents data to be delivered, the user has difficulty in receiving stable delivery of high quality contents data.

Patent Application Publication No. 2005-20312 (Patent Document 1) discloses the contents delivery system that delivers the contents, including voice and image data, without interruption of the voice communication.

In the aforementioned contents delivery system, upon reception of the contents delivery request from the mobile unit, the contents server transmits the image data to the mobile unit via the mobile packet communication network. Upon reception of the image data transmitted from the contents server, the mobile unit starts storing the image data, and sends the command for transmitting the voice data to the contents server. In response to the voice data transmission request, the contents server transmits the voice data to the mobile unit via the line switching network.

The contents server is structured to transmit the image data and the voice data via different networks. The communication quality of the line switching network for transmitting the voice data may be maintained stable even if the communication quality is degraded in the mobile packet communication network for transmitting the image data. This allows the mobile unit to receive at least the voice data with good communication quality.

[Patent Document 1] Patent Application Publication No. 2005-20312 (page 5, FIGS. 1 and 4)

SUMMARY OF THE INVENTION

In the contents delivery system as disclosed in the aforementioned Patent Document 1, in the case where the image data are normally received via the mobile packet communication network, the communication line between the mobile unit and the line switching network has to be kept connected. In other words, while the delivery of the contents data including the image and voice data is received, the communication line between the mobile unit and the line switching network has to be kept connected so as to acquire the voice, thus increasing the communication charge.

It is desirable to provide a mobile terminal unit, a contents delivery system, and a contents reproduction program capable of reproducing a series of contents data continuously at low cost irrespective of the degradation in the communication quality during the stream reproduction of the contents.

In an embodiment of the invention, a mobile terminal unit has a memory unit that stores low bit rate contents data to which a delivery source information indicating a delivery source of high bit rate contents data with respect to predetermined contents is added, the low bit rate contents data containing contents corresponding to the predetermined contents of the high bit rate contents data, a delivery source detection unit that detects the delivery source of the high bit rate contents data based on the delivery source information added to the low bit rate contents data stored in the memory unit for reproducing the predetermined contents, a receiver unit that receives the high bit rate contents data from the delivery source detected by the delivery source detection unit for reproducing the predetermined contents, a reception state detection unit that detects a reception of the high bit rate contents data performed by the receiver unit, and a reproducing unit that reproduces the high bit rate contents data received by the receiver unit while the reception state detection unit detects the reception of the high bit rate contents data performed by the receiver unit, and reproduces the low bit rate contents data corresponding to the high bit rate contents data that have been unreceived from the low bit rate contents data stored in the memory unit while the reception state detection unit detects an unreceived state of the receiver unit with respect to the high bit rate contents data.

In another embodiment of the invention, a contents delivery system includes a mobile terminal unit. The mobile terminal unit has a contents delivery unit equipped with a memory unit that stores high bit rate contents data with respect to predetermined contents and a delivery unit that delivers the high bit rate contents data that have been read from the memory unit in response to a delivery request of the predetermined contents, a memory unit that stores the low bit rate contents data with respect to the predetermined contents, to which delivery source information indicating that a delivery source of the high bit rate contents data With respect to the predetermined contents is the contents delivery unit is added, a delivery source detection unit that detects the delivery source of the high bit rate contents data based on the delivery source information added to the low bit rate contents data stored in the memory unit for reproducing the predetermined contents, a receiver unit that receives the high bit rate contents data from the contents delivery unit as the delivery source detected by the delivery source detection unit for reproducing the predetermined contents, a receiver state detection unit that detects a reception of the high bit rate contents data performed by the receiver unit, and a reproducing unit that reproduces the high bit rate contents data received by the receiver unit while the reception state detection unit detects a reception of the high bit rate contents data performed by the receiver unit, and reproduces the low bit rate contents data corresponding to the high bit rate contents data that have been unreceived from the low bit rate contents data stored in the memory unit while the reception state detection unit detects an unreceived state of the receiver unit with respect to the high bit rate contents data.

According to the embodiment of the invention, the low bit rate contents are preliminarily stored in the mobile unit so as to be reproduced in case the communication of the high bit rate contents to be received via the network is degraded. Accordingly, the reproduction of the contents may be continued while maintaining the minimum communication quality.

BRIEF DESCRIPTION OF THE DRAWINGS

FIG. 2 is a view that shows an example of a contents data (pre-data) format of the low bit rate stored in the mobile phone in the contents delivery system according to the embodiment.

FIG. 3 is a view that shows an example of a contents data block format of the high bit rate to be transmitted from the delivery unit to the mobile phone in the contents delivery system according to the embodiment.

DETAILED DESCRIPTION OF THE EMBODIMENTS

An embodiment of the present invention may be applied to the contents delivery system that delivers predetermined contents data including movies, music and the like to a mobile communication terminal, such as a mobile phone.

[System Structure]

Figure 1:
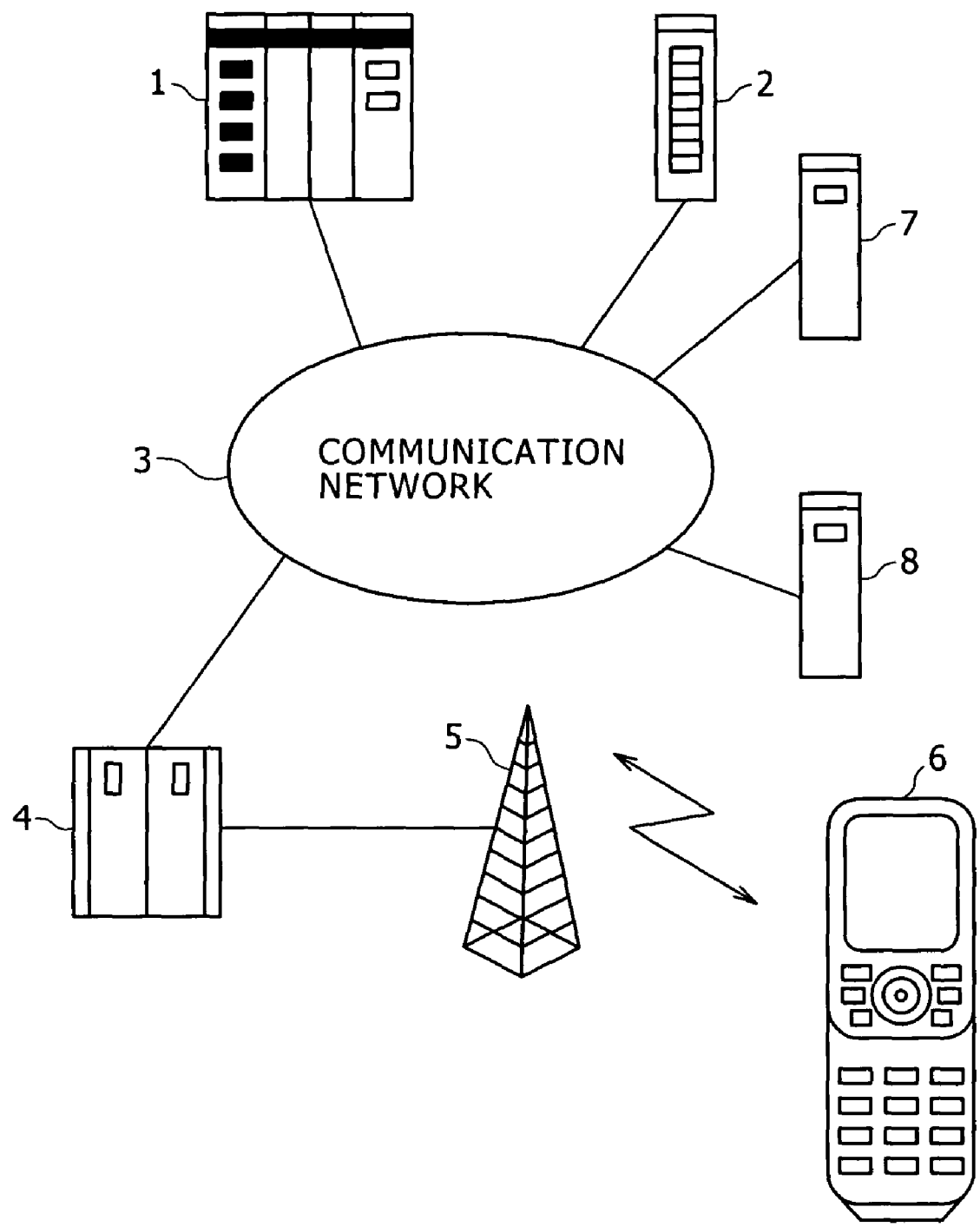
FIG. 1 is a view that schematically shows a contents delivery system according to an embodiment of the present invention.

FIG. 1 is a block diagram that shows a contents delivery system as an embodiment of the present invention. Referring to FIG. 1, the contents delivery system of the embodiment includes a delivery unit 1 that controls a predetermined contents delivery, for example, a movie and music stored in the database, a network interface (network IF) 2 for network connection of the delivery unit 1, a communication network 3, an exchange 4 connected to the communication network 3, a plurality of base stations 5, and a mobile phone 6. The base stations 5 allow radio communications with the mobile phones 6 at various locations, each having a radio communication function.

The delivery unit 1 has contents data at a low bit rate of 32 Kbps or 64 Kbps, for example (hereinafter referred to as "pre-data" according to circumstances), and contents data at a high bit rate of 128 Kbps or 384 Kbps stored therein. The delivery unit 1 stores two types of contents data, that is, the low bit rate contents data and the high bit rate contents data.

[Contents Data Structure]

Referring to FIG. 2, the low bit rate contents data (pre-data) are formed by dividing a series of contents data into a plurality of contents data blocks 31, and by adding contents ID 32 indicating the identification number of the whole contents, meta data 33 as the information with respect to the contents, block number information 34 indicating the number of the contents data block that has been divided from the series of the contents data (=the total number of the contents data blocks), and parity information 35 used for correcting an error to the contents to the contents data blocks 31.

The meta data 33 store various data with respect to music contents, for example, an album title, a title of the tune, a name of artist, and the reproduction time, or movie contents, for example, the title, the cast, the reproduction time.

Each of the contents data blocks 31 includes CBSN (Contents Block Sequence Number) information 36 indicating the reproduction order of the contents data blocks, transfer source information 37 as URL (Uniform Resource Locator) information indicating the address at which the high bit rate contents data block corresponding to the low bit rate contents data block 31 are stored, and low bit rate contents data block 38.

Like the low bit rate contents data, the high bit rate contents data are formed by dividing a series of contents data into a plurality of contents data blocks as shown in FIG. 3.

Referring to FIG. 3, each of the contents data blocks of the high bit rate contents data is formed by adding a contents ID 42 indicating the identification number of the contents, a block number information 43 indicating the number of contents data blocks divided from the series of the contents data (=total number of contents data blocks), a CBSN information 44 indicating the order of reproducing the contents data blocks, and a parity information 45 used for correcting error with respect to the contents data block to high bit rate data 41.

The data contents of the CBSN information 36 as the low bit rate contents data blocks are the same as those of the high bit rate contents data block with the CBSN information 44 except for the different bit rate. Specifically, the data contents of the third contents data block (CBSN=3) of the low bit rate contents data are the same as those of the third contents data block (CBSN=3) of the high bit rate stream data. Likewise, the data contents of the first contents data block (CBSN=1) of the low bit rate stream data are the same as those of the first contents data block (CBSN=1) of the high bit rate stream data.

In the contents delivery system according to the embodiment, the low bit rate contents data are preliminarily stored in the mobile phone 6 such that the high bit rate contents data are downloaded and reproduced by accessing the source for delivering the high bit rate contents data corresponding to the low bit rate contents data based on the source information 37 of the low bit rate contents data. In the case where communication state with the source is degraded upon downloading of the high bit rate contents data, the low bit rate contents data preliminarily stored may be reproduced in place of the high bit rate contents data. The continuity of the contents, thus, may be maintained.

The explanation will be given hereinafter on the assumption that the high bit rate contents data are downloaded from the delivery unit 1 as the delivery source of such contents. However, the high bit rate contents data may be downloaded from a personal computer 7 at the home of the user of the mobile phone 6, as shown in FIG. 1, or from a server system 8 provided by the internet provider with which the user of the mobile phone 6 has signed up rather than the delivery unit 1. Alternatively, the respective high bit rate contents data blocks may be distributed into the delivery unit 1, the personal computer 7, and the server system 8 so as to be stored therein. Each of the low bit rate contents data blocks stores the information (=delivery source information 37) that indicates the source of the corresponding high bit rate contents data block. This makes it possible to distribute the high bit rate contents data blocks so as to be retained in the aforementioned manner.

[Structure and Operation of Mobile Phone]

Figure 4:
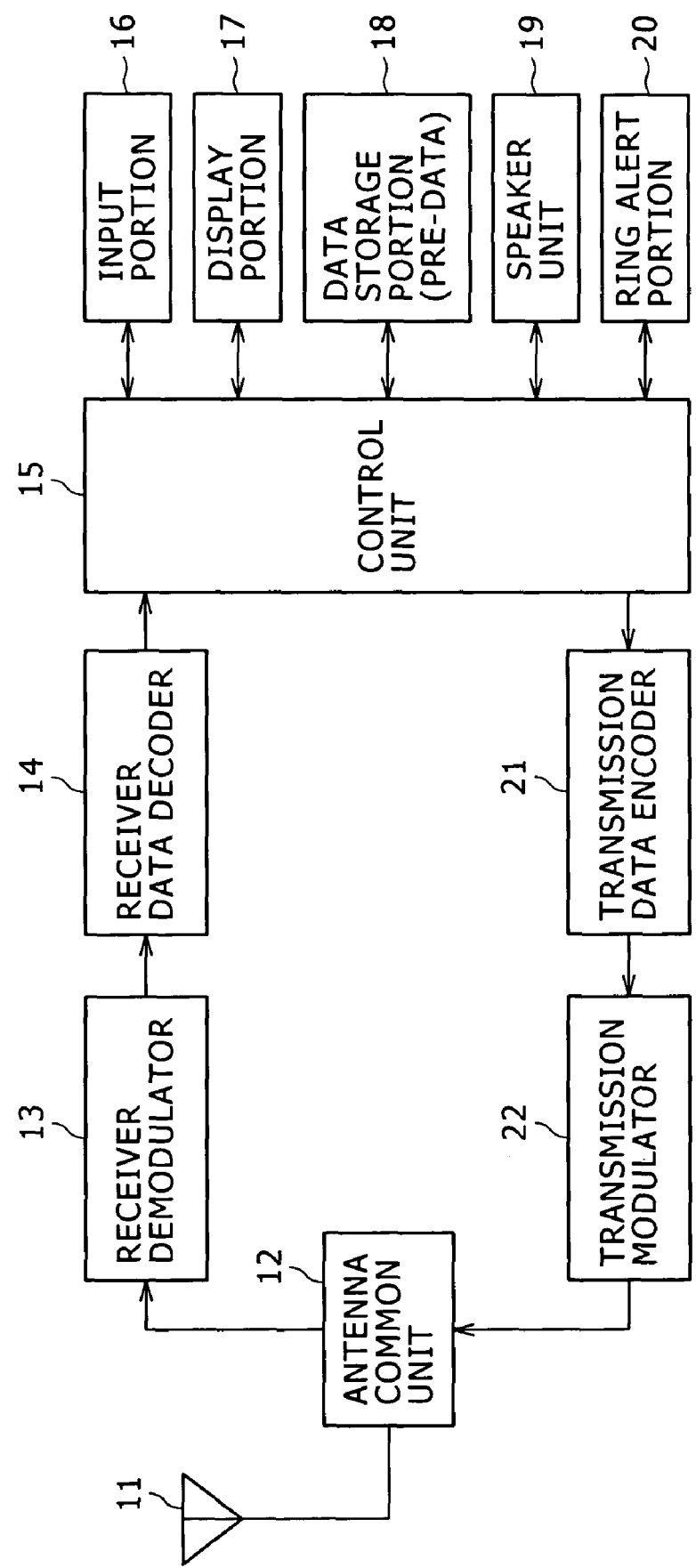
FIG. 4 is a block diagram of the mobile phone used in the contents delivery system according to the embodiment.

FIG. 4 is a block diagram of the mobile phone 6 employed in the contents delivery system. Referring to FIG. 4, in the receiver system of the mobile phone 6, the signal transmitted from the base station 5 is received by an antenna 11, and then supplied to a receiver demodulation unit 13 via an antenna common unit 12. The receiver demodulation unit 13 includes a RF circuit through which the demodulation, for example, the band limiting process, is performed so as to control the signal sent from the antenna common unit 12 to an appropriate level. The signal demodulated in the receiver demodulation unit 13 is converted into a digital signal through an A/D converter and further supplied to a receiver data decoding unit 14.

The data decoding unit 14 subjects the received data demodulated in the receiver demodulation unit 13 to a base band signal process so as to be decoded into the original received data and supplied to a control unit 15. The control unit 15 is a microcomputer including an CPU, a RAM, a ROM, an EEPROM, and the like for controlling an input portion 16 such as a key and a jog dial, a display portion 17 such as a LCD, a data storage portion 18 such as an internal memory and an external memory, a speaker portion 19 for outputting an alarm, voice, sounds of the music contents, and a ring alert portion 20 for alerting an incoming call such as a LED and a ringer.

The aforementioned low bit rate contents data are downloaded from the delivery unit 1 or transferred from the personal computer owned by the user so as to be stored in the data storage portion 18. The low bit rate contents data may be preliminarily transferred from the personal computer of the user to the external memory. Then the external memory is attached to be connected to the mobile phone 6 so as to store the low bit rate contents data therein.

In the case where the contents transmission request message to transmit the low bit rate and high bit rate contents data and the confirmation message that confirms the reception of the contents data (acknowledgment message with respect to the data reception) are transmitted in the transmission system of the mobile phone 6, the control unit 15 generates the transmission data of the contents transmission request message and the confirmation message so as to be supplied to a transmission data encoding unit 21.

The transmission data encoding unit 21 encodes the transmission data with a predetermined encoding process so as to be compressed and supplied to a transmission modulation unit 22. The transmission modulation unit 22 subjects the compressed encoded transmission data to the D/A conversion process to generate an analogue modulation signal. The analogue modulation signal is converted into a transmission signal at a desired transmission frequency. The transmission modulation unit 22 includes a RF circuit through which the transmission signal converted at the desired frequency is power amplified to the required transmission power. The power amplified transmission signal is transmitted to the base station 5 via the antenna common unit 12 and the antenna 11.

The control unit 15 allows the EEPROM installed therein to retain the information about the communication results just before the mobile phone 6 is turned off. Upon turning the mobile phone 6 ON, the control unit 15 is capable of coping with the radio abnormality during delivery or the battery abnormality based on the information stored in the EEPROM.

[Contents Delivery Operation]
[Basic Operation of System]

Figure 5:
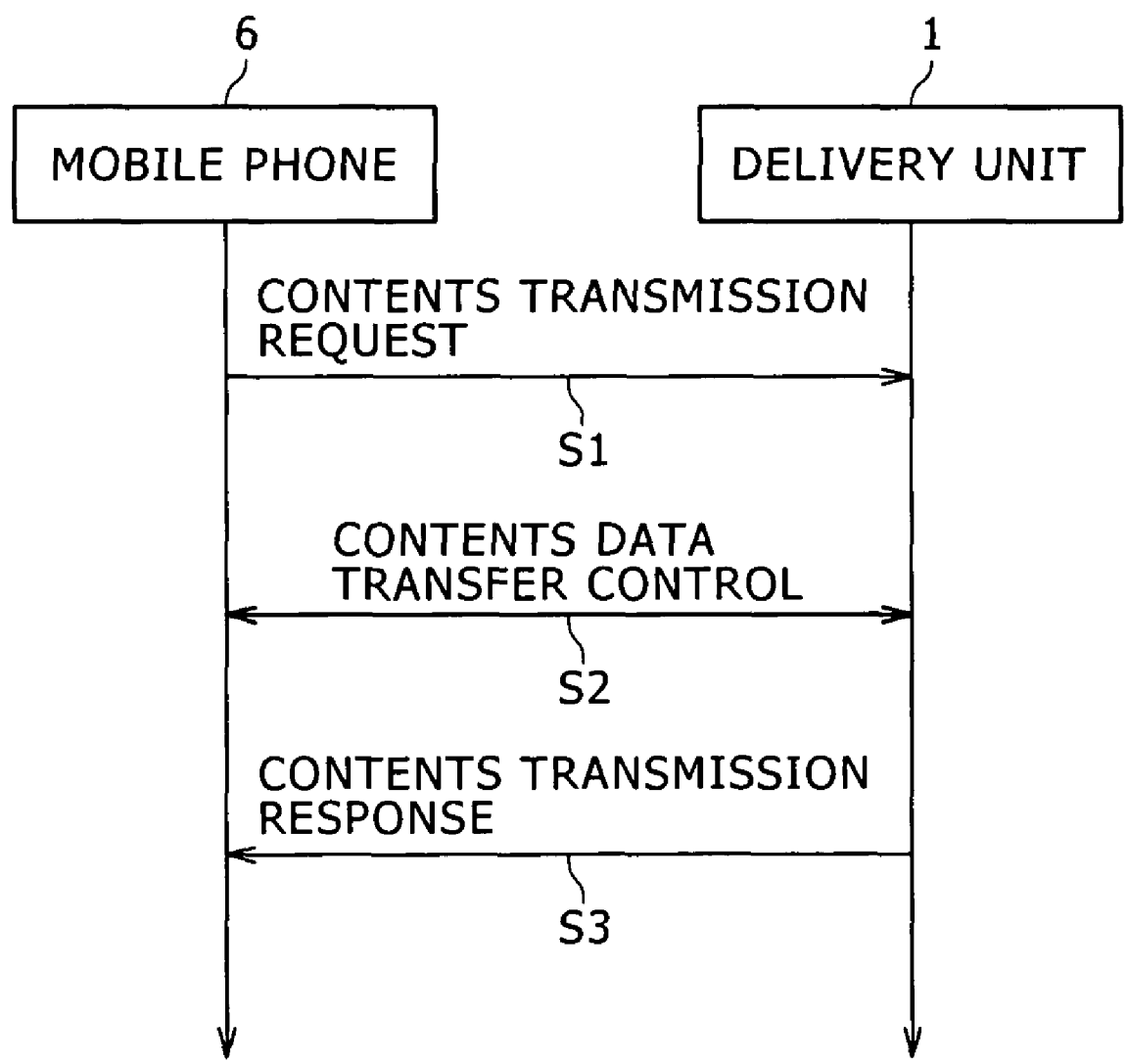
FIG. 5 is a view that shows a sequence of the basic operation of the contents delivery in the contents delivery system according to the embodiment.

FIG. 5 shows a basic sequence of the contents delivery system according to the embodiment. Referring to FIG. 5, in the contents delivery system, the mobile phone 6 transmits the contents transmission request of the high bit rate contents data to the delivery unit 1 based on the delivery source information 37 added to the low bit rate contents data block in step S1.

Upon reception of the contents transmission request, the delivery unit 1 confirms the contents identification number (contents ID) and starts execution of the contents data transfer control in step S2. The contents data transfer control is executed so as to make sure to deliver the contents data to the mobile phone 6 from the delivery unit 1. If the delivery is interrupted, the information of the delivery results may be stored under the contents data transfer control. Upon normal completion of the contents data transfer control, the delivery unit 1 transmits a contents transmission response to the mobile phone 6 in step S3 and terminates the contents data transfer control.

[System Operation in Normal State]

Figure 6:
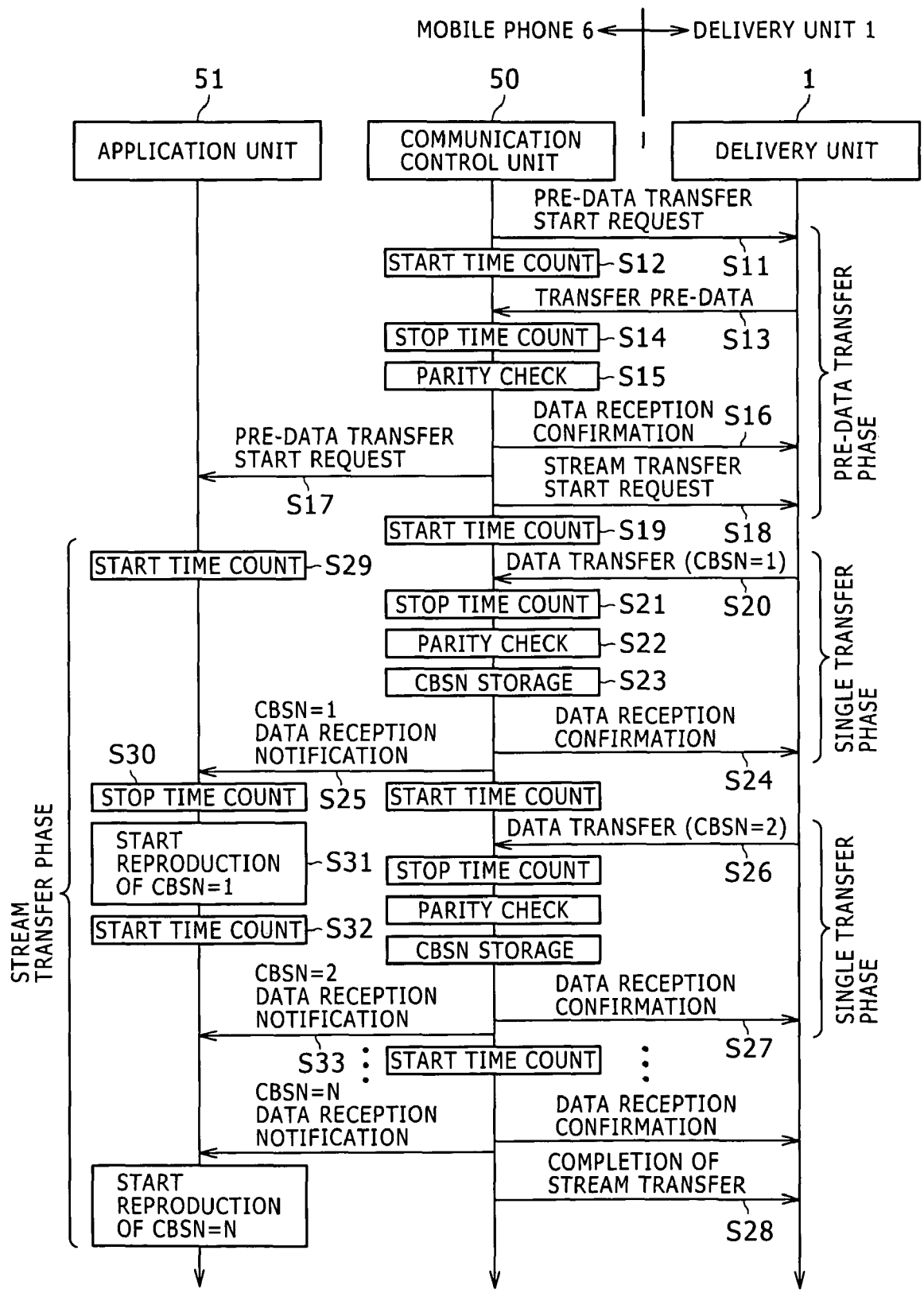
FIG. 6 is a view that shows a sequence of the operation of the contents delivery between the mobile phone and the delivery unit in the normal communication state of the contents delivery system according to the embodiment.

FIG. 6 shows a sequence of the operation of the contents delivery system in the normal state in the case where the low bit rate contents data (pre-data) are downloaded from the delivery unit 1.

Referring to FIG. 6, the control unit 15 of the mobile phone 6 serves as a communication control unit 50 based on the "contents process program" stored in the mobile phone 6. In step S11, the control unit 15 transmits a pre-data transfer start request to the delivery unit 1 so as to download the low bit rate contents data (pre-data). Then, in step S12, a retransmission control timer for the pre-data is allowed to start time counting.

Upon reception of the pre-data transfer start request, the delivery unit 1 transfers the low bit rate contents data (pre-data) shown in FIG. 2 to the mobile phone (pre-data transfer) in step S13.

Upon reception of the pre-data, the control unit 15 of the mobile phone 6 serves as the communication control unit 50 to interrupt the time count performed by the retransmission control timer in step S14. Then, in step S15, the parity check of the pre-data is performed based on the parity information 35 (see FIG. 2) of the received pre-data. If it is confirmed that the pre-data have been normally received without causing a parity error, the control unit 15 serves as the communication control unit 50 to transmit the acknowledgment of data reception indicating the completion of receiving the pre-data to the delivery unit 1 in step S16. The control unit 15 then serves as an application unit 51 in step S17 to confirm the completion of the pre-data reception.

The "pre-data transfer phase", as the pre-data downloading phase shown in FIG. 6, is terminated. The control unit 15 of the mobile phone 6 stores the downloaded pre-data in the data storage portion 18 as the internal or the external memory so as to be retained.

In the aforementioned example, it is assumed that the pre-data are downloaded from the delivery unit 1. However, the pre-data may be preliminarily stored in the internal or the external memory of the mobile phone 6 using the personal computer 7 owned by the user. In this case, as the pre-data have been already stored in the mobile phone 6, execution of the "pre-data transfer phase" will be omitted.

The user commands reproduction of the desired contents that have been selected through the operation of the input portion 16 of the mobile phone 6 as shown in FIG. 4. More specifically, in response to the selection of the desired contents by the user through the input portion 16, the control unit 15 shown in FIG. 4 serves as the application unit 51 to read the meta data 33 of the pre-data stored in the data storage portion 18 based on the "contents process program" stored in the mobile phone 6 (see FIG. 2) and executes the control to display the user interface for selection of the contents shown in FIG. 7 on the display portion 17.

Figure 7:
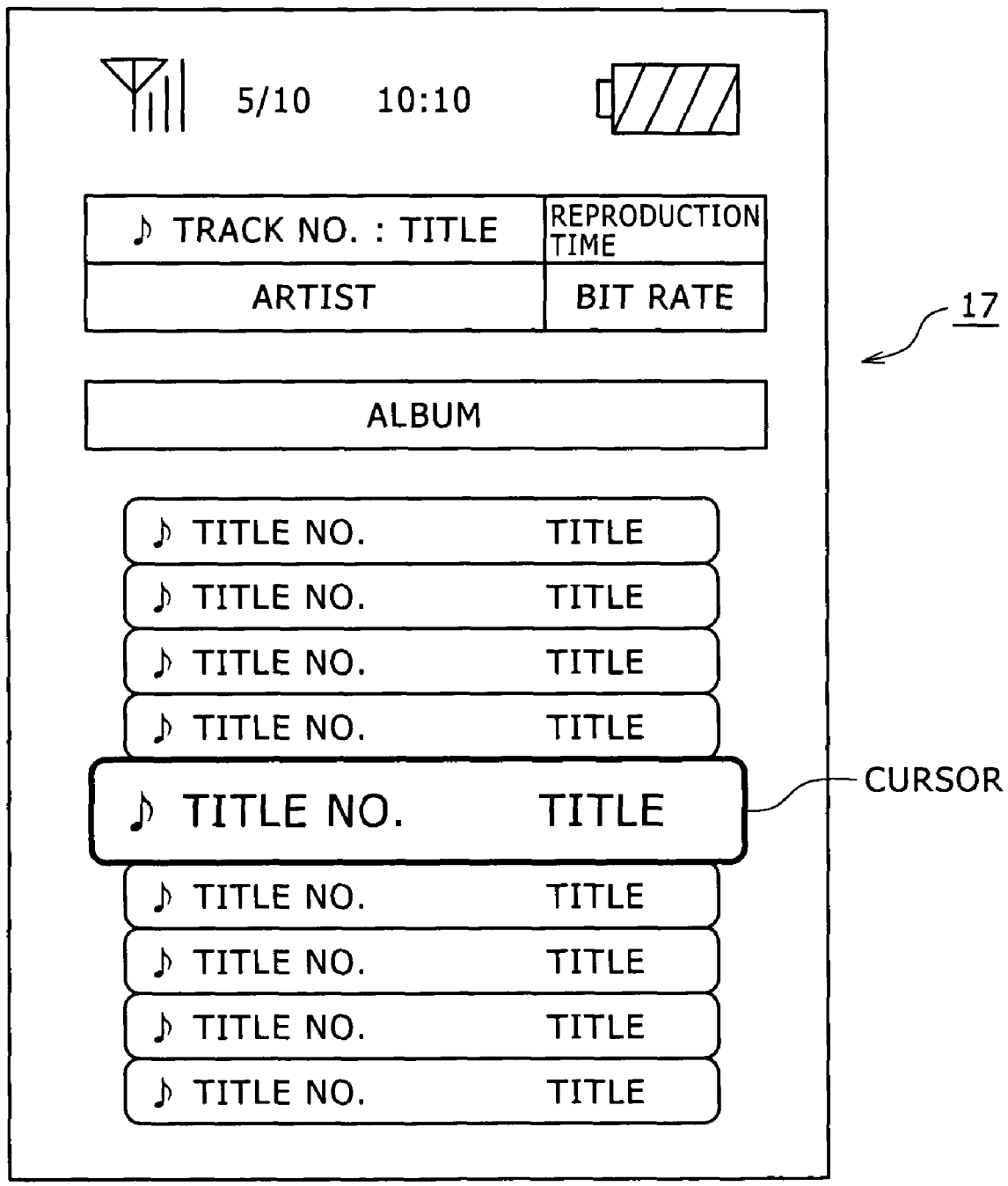
FIG. 7 is a view that graphically shows the user interface displayed on the mobile phone in the contents delivery system according to the embodiment.

FIG. 7 shows an example of the user interface (=user interface for play list) for the music contents selection. Referring to FIG. 7, in response to the selection of the desired contents performed by the user, the application unit 51 controls such that the cursor for selecting the desired title is displayed on the display portion 17 together with the album's title, title number, title, name of artist, bit rate, and reproduction time based on the meta data 33 of the pre-data.

The user moves the cursor through the input portion 16 to select the desired tune. After the selection of the desired tune, the control unit 15 serves as the communication control unit 50 based on the contents process program. Then, the stream transfer start request with respect to the high bit rate contents data block is transmitted to the transfer source indicated by the transfer source information 37 of the pre-data corresponding to the tune selected by the user.

As both the low bit rate and the high bit rate contents data are divided into a plurality of contents data blocks, they have contents data blocks attached to the same block numbers (contents block sequence number: CBSN). The delivery source information 37 attached to the low bit rate contents data is added to the respective contents data blocks as shown in FIG. 2.

Firstly, the control unit 15 detects the delivery source (delivery unit 1 in this case) that delivers the first high bit rate contents data block based on the transfer source information 37 attached to the first contents data block. Then, the control unit 15 transmits the stream transfer start request to the delivery source as shown in step S18.

The example shown in FIG. 6 represents that the pre-data store the transfer source information 37 indicating the delivery unit 1 as the transfer source. In the case where the pre-data store the transfer source information 37 indicating the personal computer at the user's home shown in FIG. 1 as the transfer source, the control unit 15 transmits the stream transfer start request to the personal computer 7 at the user's home. Meanwhile, in the case where the pre-data store the transfer source information 37 indicating the server system 8 of the provider with which the user has signed up as the transfer source, the control unit 15 serves as the communication control unit 50 to transmit the stream transfer start request to the server system 8 of the user's provider.

The system may be structured to allow the delivery unit 1, the personal computer 7 at the user's home, or the server system 8 of the provider to perform the user authentication in response to the reception of the stream transfer start request based on the transfer source information 37.

Subsequent to the stream transfer start request, the control unit 15 allows the retransmission control timer to start time counting in step S19. In step S20, in response to the stream transfer start request, the delivery unit 1 transmits the first high bit rate contents data of the tune selected by the user to the mobile phone 6. In response to a reception of the first high bit rate contents data block, the control unit 15 of the mobile phone 6 interrupts the time counting of the retransmission control timer in step S21.

The control unit 15 executes the parity check with respect to the thus received first high bit rate contents data block based on the parity information 45 shown in FIG. 3 in step S22. If the parity error is not detected in the parity check, the control unit 15 stores the received first high bit rate contents data block in the data storage portion 18 in the mobile phone 6 and executes the control to store the CBSN information (CBSN=1) indicating the reception of the first contents data block in the data storage portion 18 of the mobile phone 6 in step S23.

The control unit 15 transmits the information indicating the normal reception of the first high bit rate contents data block and the block number (CBSN=1) of the received contents data block to the delivery unit 1 as acknowledgment of data reception in step S24. In step S25, the control unit 15 recognizes the reception of the first high bit rate contents data block (CBSN=1 data reception notification).

The operation from the stream transfer start request in step S18 to the recognition of the received contents data block in step S25 may form a single transfer phase of the high bit rate contents data block.

Being triggered by the data reception confirmation from the mobile phone 6 in step S24, the delivery unit 1 transmits the second high bit rate contents data block to the communication control unit 50 in step S26.

The control unit 15 of the mobile phone executes the parity check with respect to the second contents data block. In the case where the parity error is not detected, the control unit 15 transmits the data reception confirmation indicating the normal reception of the second contents data block to the delivery unit 1 in step S27. In step S28, the control unit 15 serves as the application unit 51 to recognize a reception of the second contents data block. In response to the reception of the data reception confirmation indicating the normal reception of the second contents data block, the delivery unit 1 is triggered to transmit the third high bit rate contents data block to the mobile phone 6.

In the aforementioned case, the delivery unit 1 serves as the delivery source for distributing the respective contents data blocks. The delivery of the first high bit rate contents data block from the delivery unit 1 to the mobile phone 6 is triggered by the "stream transfer start request" in step S18 as aforementioned. The delivery of the second and subsequent high bit rate contents data blocks will be triggered by the "data reception confirmation" in steps S24, S27 and the like in the order of the block number.

If the delivery sources indicated by the transfer source information 37 attached to the respective low bit rate contents data blocks are different by the respective contents data blocks, the control unit 15 of the mobile phone 6 serves as the communication control unit 50 to designate the contents data block number (CBSN information) to transmit the "data transfer request" to the corresponding delivery source. This allows the delivery of the high bit rate contents data blocks sequentially from the respective delivery sources.

Upon completion of receiving all the high bit rate contents data by the respective contents data blocks, the control unit 15 transmits the stream transfer completion notification indicating the completion of receiving all the contents data blocks to the delivery unit 1 in step S28. In this way, the transfer of the high bit rate contents data corresponding to the tune selected by the user is completed.

Meanwhile, the control unit 15 in the mobile phone 6 serves as the application unit 51 in step S17 to recognize the completion of the pre-data reception in step S17. Then in step S29, the control unit 15 allows the reproduction time control timer to start time counting. For example, the time counted by the reproduction time control timer is set to the time required for reproducing a single contents data block. If the completion of receiving the first high bit rate contents data block is recognized in step S25 before a time-out of the time count performed by the control unit 15, the time count is interrupted in step S30. Then, in step S31, the reproduction of the first high bit rate contents data block received in step S20 is started.

When the reproduction of the first high bit rate contents data block is started, the control unit 15 allows the reproduction time control timer to start time counting in step S32. When the completion of receiving the second high bit rate contents data block is recognized (notification of CBSN=2 data reception), as step S33 shows, the control unit 15 interrupts the time counting performed by the reproduction time control timer and starts reproducing the second high bit rate contents data block received in step S26.

The control unit 15 reproduces the high bit rate contents data blocks in the order of reception. This makes it possible to output the reproduction of the high bit rate contents data blocks via the speaker unit 19 shown in FIG. 4.

In the case where the control unit 15 functions as the application unit 51 while the reproduction is not performed (in the standby state until the user commands the start of reproduction), based on the meta data 33 of the low bit rate contents data block, the control unit 15 displays the number (track number) and title of the tune selected with the cursor in the display area of the track number and the title, as shown in FIG. 7, as well as the reproduction time. During the reproduction, the track number and the title of the tune are displayed in the corresponding display area as well as the time for currently reproducing the selected tune in the corresponding display area of the reproduction time.

[System Operation in Degraded Communication State]

The above explanation has been made with respect to the case where the high bit rate contents data blocks delivered from the delivery unit 1 are normally received by the mobile phone 6. If the mobile phone 6 is located in an area out of service, the communication state between the mobile phone 6 and the delivery unit 1 may be degraded. This may make it difficulty for the mobile phone 6 to receive the high bit rate contents data blocks delivered from the delivery unit 1.

In the contents delivery system according to the embodiment, if the communication state between the mobile phone 6 and the delivery unit 1 is degraded, and therefore, the mobile phone 6 has difficulty in receiving the high bit rate contents data block from the delivery unit 1, the low bit rate contents data blocks (pre-data) that have been preliminarily received may be reproduced in place of the high bit rate contents data block. This makes it possible to reproduce the series of contents without interruption.

Figure 8:
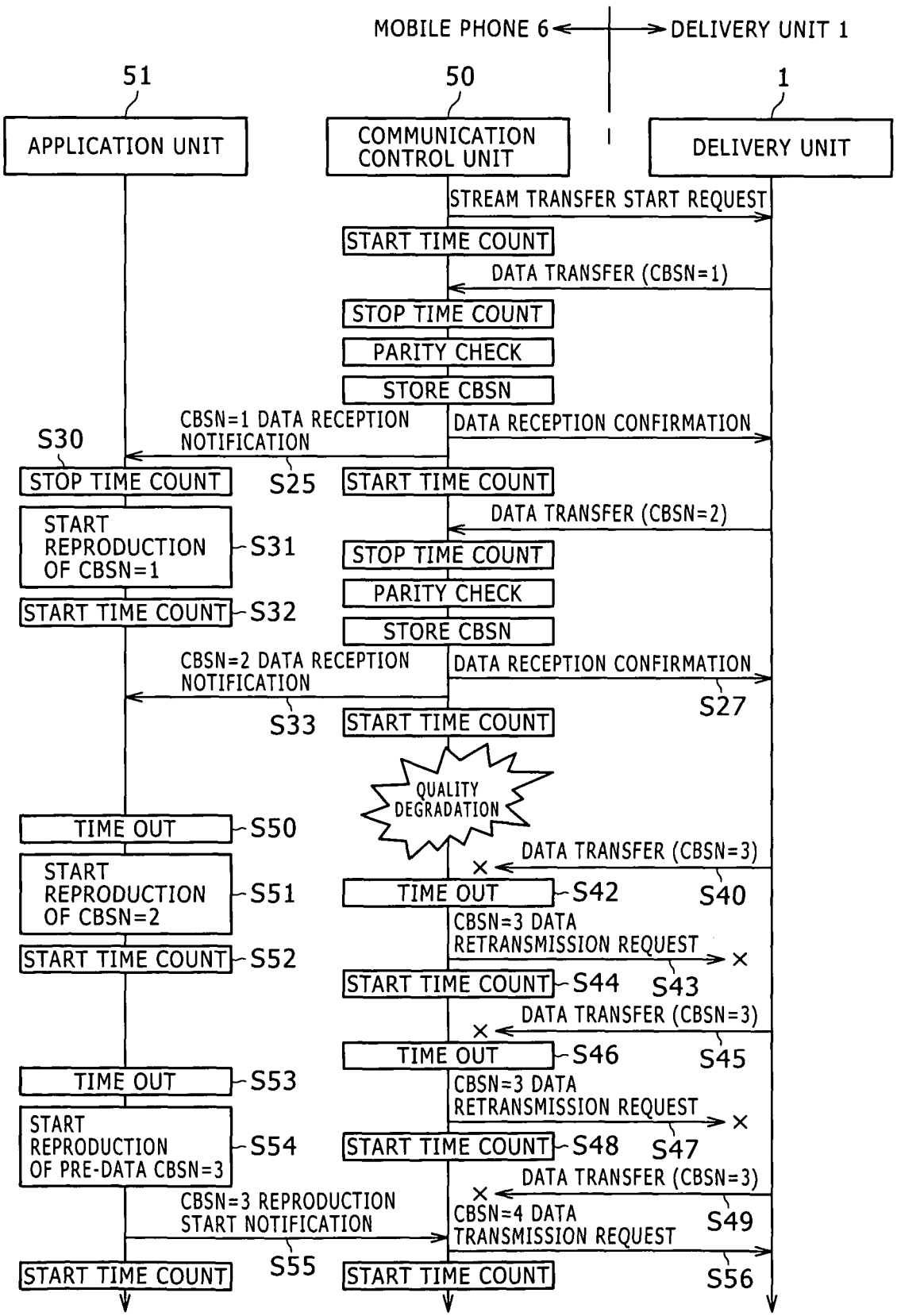
FIG. 8 is a view that shows a sequence of the operation of the contents delivery between the mobile phone and the delivery unit in the state where communication of the contents delivery system according to the embodiment is degraded.

FIG. 8 is a sequence chart of the system operation in the case where the mobile phone 6 is unable to receive the high bit rate contents data block delivered from the delivery unit lowing to the degraded communication state between the mobile phone 6 and the delivery unit 1.

The sequence chart in FIG. 8 represents the degradation of the communication state between the mobile phone 6 and the delivery unit 1 resulting from the movement of the mobile phone 6 to the location out of service immediately after the mobile phone 6 transmits the data reception confirmation to the delivery unit 1 indicating the normal reception of the second high bit rate contents data block (CBSN=2) in step S27.

In the aforementioned case, the delivery unit 1 transmits the third high bit rate contents data block to the mobile phone 6 triggered by the data reception confirmation indicating the normal reception of the second contents data blocks in step S40. However, the mobile phone 6 is unable to receive the third high bit rate contents data blocks as it is at the location out of service. The control unit 15 of the mobile phone 6 functions as the communication control unit 50 to cause the reproduction control timer that has started time counting in step S41 to be in the time-out state in step S42.

When the time-out of the reproduction control timer is detected, the control unit 15 of the mobile phone 6 transmits the retransmission request (CBSN=3 data retransmission request) with respect to the third high bit rate contents data block to the delivery unit 1, as step S43 shows. Then the control unit 15 controls the retransmission control timer to start time counting.

In response to the reception of the retransmission request, the delivery unit 1 transmits the third high bit rate contents data block to the mobile phone 6 again, as step S45 shows. In this case, as the mobile phone 6 is at the location out of service, the mobile phone 6 is unable to receive the third contents data block. Accordingly, the retransmission control timer of the mobile phone 6 is brought into the time-out state again, as step S46 shows.

When the time-out state of the retransmission control timer is detected, the control unit 15 of the mobile phone 6 transmits the retransmission request with respect to the third high bit rate contents data block again (CBSN=3 data retransmission request), as step S47 shows. The control unit 15 further controls the retransmission control timer to start time counting in step S48.

In response to the reception of the CBSN=3 data retransmission request, the delivery unit 1 transmits the third high bit rate contents data blocks to the mobile phone 6 again, as step S49 shows. In this case, as the mobile phone 6 is at the location out of service, the mobile phone 6 is unable to receive the third contents data blocks.

In the case where the control unit 15 of the mobile phone 6 functions as the application unit 51 in the normal operation state, the control unit 15 starts reproducing the contents data blocks sequentially from the first contents data blocks that have been already received, as steps S30 to S32 show (see step S25 in FIG. 8), when the completion of receiving the first high bit rate contents data block is recognized. In the case where the mobile phone 6 is moved to the location out of service immediately after the completion of receiving the second contents data block, the reception of the third high bit rate contents data block has not been completed yet.

The control unit 15 of the mobile phone 6 reads the third low bit rate contents data block corresponding to the third high bit rate contents data which has not been received from the delivery unit from the pre-data (low bit rate contents data) stored in the data storage portion 18 upon completion of the reproduction of the second high bit rate contents data block, as steps S50 to S53 show. The control unit 15 reproduces the third low bit rate contents data block subsequent to the reproduction of the second high bit rate contents data block.

The control unit 15 reads and reproduces the third low bit rate contents data block having the same data contents as those of the third high bit rate contents data block from the pre-data that have been preliminarily received in place of the third high bit rate contents data block that have been unreceived.

In response to the start of reproducing the low bit rate contents data block, the control unit 15 of the mobile phone 6 functions as the communication control unit 50 in step S55 and recognizes that reproduction of the third contents data block has been started. Based on the recognition, the control unit 15 transmits the transmission request with respect to the 4th contents data block (CBSN=4 data transmission request) as the one subsequent to the third contents data block that has been already reproduced to the delivery unit 1. The delivery unit 1 is expected to transmit the fourth high bit rate contents data block to the mobile phone 6 in response to the CBSN=4 data transmission request.

In the case where the mobile phone 6 is unable to receive the fourth high bit rate contents data block from the delivery unit 1, the control unit 15 reproduces the fourth low bit rate contents data block read from the pre-data.

If the mobile phone 6 has not received the high bit rate contents data to be reproduced from the delivery unit 1 before the start of reproducing the subject contents data block, the control unit 15 detects the low bit rate contents data block corresponding to the high bit rate contents data block that has been unreceived from the preliminarily received pre-data and reproduces the detected low bit rate contents data block in place of the high bit rate contents data block that has not been received. This makes it possible to reproduce the contents data blocks at the low bit rate sequentially without interruption of the reproduction operation.

[System Operation in the Reformed Communication State]

Figure 9:
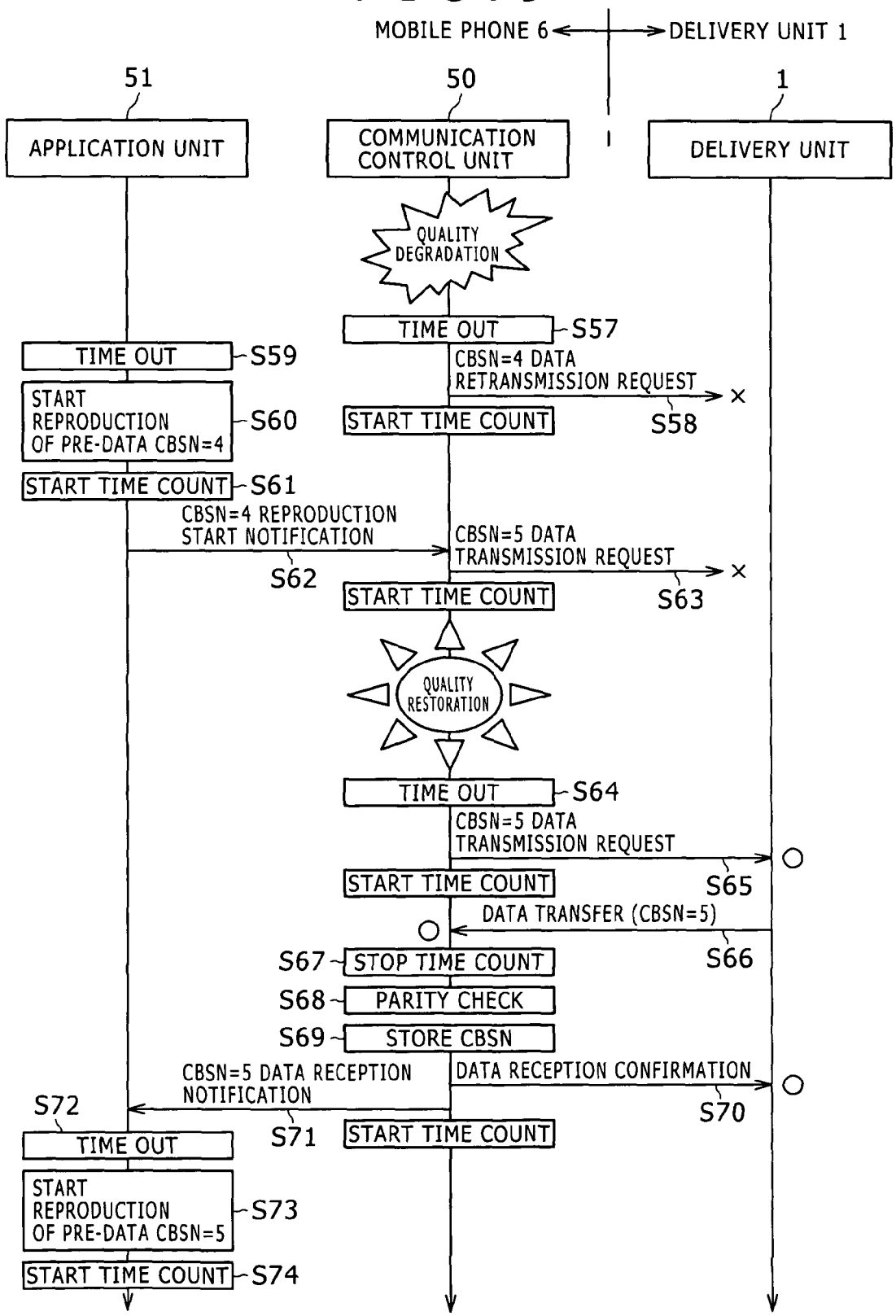
FIG. 9 is a view that shows a sequence of the operation of the contents delivery between the mobile phone and the delivery unit in the state where the communication state is reformed from the degradation thereof in the contents delivery system according to the embodiment.

FIG. 9 is a sequence chart of the system operation in the communication state that has been reformed from the degraded state. FIG. 9 represents the sequence from the sequence chart shown in FIG. 8, starting at the stage of detecting the time-out of the retransmission control timer in response to the transmission request of the fourth high bit rate contents data block from the mobile phone 6 to the delivery unit 1 in step S57 upon reproduction of the third low bit rate contents data block owing to the degraded communication state.

In the aforementioned case, the control unit 15 of the mobile phone 6 transmits the transmission request of the fourth high bit rate contents data block (CBSN=4 data retransmission request) to the delivery unit 1 again as step S58 shows. As the communication state between the mobile phone 6 and the delivery unit 1 has been kept in the degraded state, the CBSN=4 data retransmission request has not been transmitted from the mobile phone 6 to the delivery unit 1. The mobile phone 6 is, thus, unable to receive the fourth high bit rate contents data block from the delivery unit 1.

The control unit 15 of the mobile phone 6 reproduces the fourth low bit rate contents data block read from the pre-data subsequent to the reproduction of the third low bit rate contents data block as steps S59 to S61 show. The control unit 15 recognizes the start of reproducing the fourth contents data block in step S62 (notification of starting reproduction of CBSN=4) and transmits the transmission request of the fifth high bit rate contents data block to the delivery unit 1 in step S63.

As the communication state between the mobile phone 6 and the delivery unit 1 has been kept in the degraded state, the delivery unit 1 is unable to receive the transmission request of the fifth high bit rate contents data block. Then, the time-out state of the retransmission control timer of the mobile phone 6 is detected as step S64 shows. In the case where the communication state between the mobile phone 6 and the delivery unit 1 is reformed within the period from the timing at which the transmission request of the fifth high bit rate contents data block is transmitted to the timing at which the time-out of the retransmission control timer is detected, the delivery unit 1 receives the retransmission request of the fifth high bit rate contents data block (CBSN=5 data retransmission request) from the mobile phone 6, as step S65 shows.

In response to the reception of the CBSN=5 data retransmission request, the delivery unit 1 transmits the fifth high bit rate contents data block to the mobile phone 6 in step S66. In response to the reception of the fifth high bit rate contents data block, the control unit 15 of the mobile phone 6 executes the parity check as described above in steps S67 to S69. If no parity error is detected, the fifth high bit rate contents data block will be stored in the data storage portion 18. In step S70, the data reception confirmation indicating the completion of receiving the fifth contents data block is transmitted to the delivery unit 1. Then, in step S71, the control unit 15 functions as the application unit 51 to recognize that the reception of the fifth high bit rate contents data block has been completed.

Being triggered by the data reception confirmation, the delivery unit 1 transmits the sixth high bit rate contents data block to the mobile phone 6. In response to the recognition that the reception of the fifth high bit rate contents data block from the delivery unit 1 has been completed, the control unit 15 of the mobile phone 6 reproduces the fifth high bit rate contents data block, as steps S72 to S74 show, subsequent to the reproduction of the fourth low bit rate contents data block.

When the communication state between the mobile phone 6 and the delivery unit 1 is reformed to allow the reception of the high bit rate contents data block from the delivery unit 1, the contents data block to be reproduced is switched from the low bit rate contents data block to the high bit rate contents data block.

When the control unit 15 of the mobile phone 6 functions as the communication control unit 50 to detect the completion of receiving all the contents data blocks corresponding to the series of the contents data, the stream transfer completion notification is transmitted to the delivery unit 1, as step S28 shows. In response to the reception of the stream transfer completion notification, the delivery unit 1 recognizes that all the contents data blocks corresponding to the series of the contents data have been received by the mobile phone 6 and stops transmitting the high bit rate contents data blocks.

[Deleting operation of the High Bit Rate Contents Data Block]

The pre-data (low bit rate contents data) and the high bit rate contents data block are stored in the data storage portion 18 shown in FIG. 1. The mobile phone 6 in the contents delivery system according to the embodiment is designed by the user to delete or structured to automatically delete the high bit rate contents data block from the data storage portion 18 after completion of reproduction.

More specifically, the user is allowed to determine whether or not the high bit rate contents data block is deleted from the data storage portion 18 after completion of reproduction through operations of the input portion 16. The setting information is stored in the data storage portion 18 through the control portion 15 of the mobile phone 6.

When reproduction of the series of the contents data is finished, the control unit 15 of the mobile phone 6 reads the setting information stored in the data storage portion 18. If the setting information indicates to delete the contents data, the high bit rate contents data stored in the data storage portion 18 will be deleted.

Accordingly, only the pre-data are left stored in the data storage portion 18. As the high bit rate contents data are delivered from the delivery unit 1 so as to be reproduced, high quality data (=high bit rate contents data) may be reproduced while keeping the data (=pre-data) stored in the data storage portion 18 as minimum data. Since the high bit rate contents data do not have to be stored in the data storage portion 18, the storage area thereof is efficiently used.

[Operation of Respective Portions of Contents Delivery System]

The operation of each portion of the contents delivery system according to the embodiment will be described hereinafter. The respective portions are operated under the control of software by executing the process based on predetermined programs by the respective main control units.

[Pre-data Transfer Operation of Delivery Unit]

Figure 10:
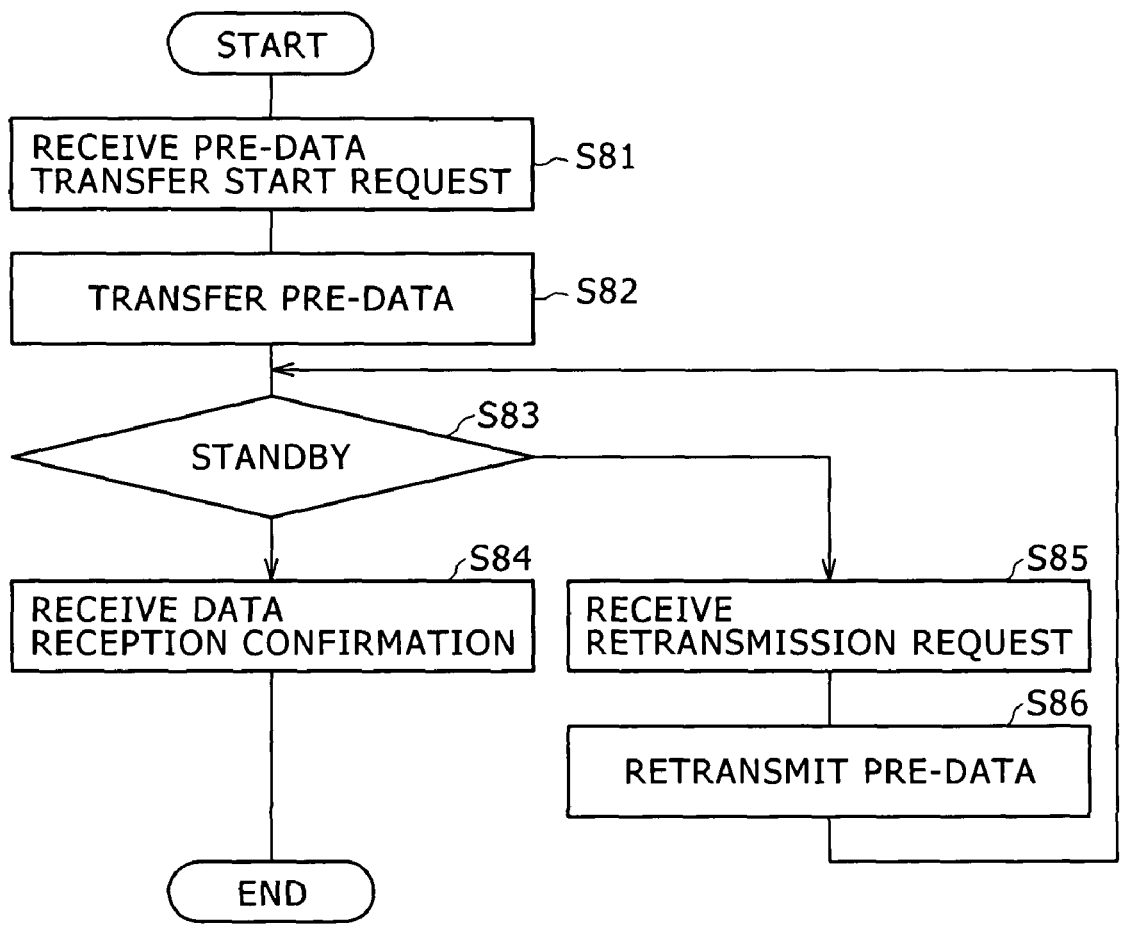
FIG. 10 is a flowchart of a control routine of the pre-data transfer in the delivery unit of the contents delivery system according to the embodiment.

The operation process for the delivery unit for transferring pre-data will be described referring to a flowchart of FIG. 10. Referring to the flowchart of FIG. 10, in response to reception of the transfer start request of the pre-data from the mobile phone 6 in step S81, the delivery unit 1 transfers the pre-data to the mobile phone 6 in step S82 and is brought into a standby state in step S83.

In response to the reception of the pre-data from the delivery unit 1, the mobile phone 6 transmits the data reception confirmation indicating that the reception of the pre-data has been completed to the delivery unit 1. If the mobile phone 6 is unable to receive the pre-data from the delivery unit 1, the transmission request of the pre-data (=pre-data retransmission request) is transmitted to the delivery unit 1 again.

In the standby state in step S83, the delivery unit 1 monitors whether the data reception confirmation has been transmitted from the mobile phone 6, or whether the pre-data retransmission request has been transmitted. In response to the reception of the data reception confirmation from the mobile phone 6, the delivery unit 1 terminates the process shown by the flowchart of FIG. 10 via step S84 and starts delivery of the high bit rate contents data block upon reception of the stream transfer start request (see step S18 in FIG. 6) from the mobile phone 6.

In response to the reception of the pre-data retransmission request in the standby state in step S83, the process proceeds to step S86 via step S85 where the delivery unit 1 transmits the pre-data to the mobile phone 6 again and is brought into the standby state in step S83. In response to the reception of the data reception confirmation from the mobile phone 6, the delivery unit 1 terminates the pre-data transfer process.

[Delivery of High Bit Rate Contents Data Block Performed by Delivery Unit]

Figure 11:
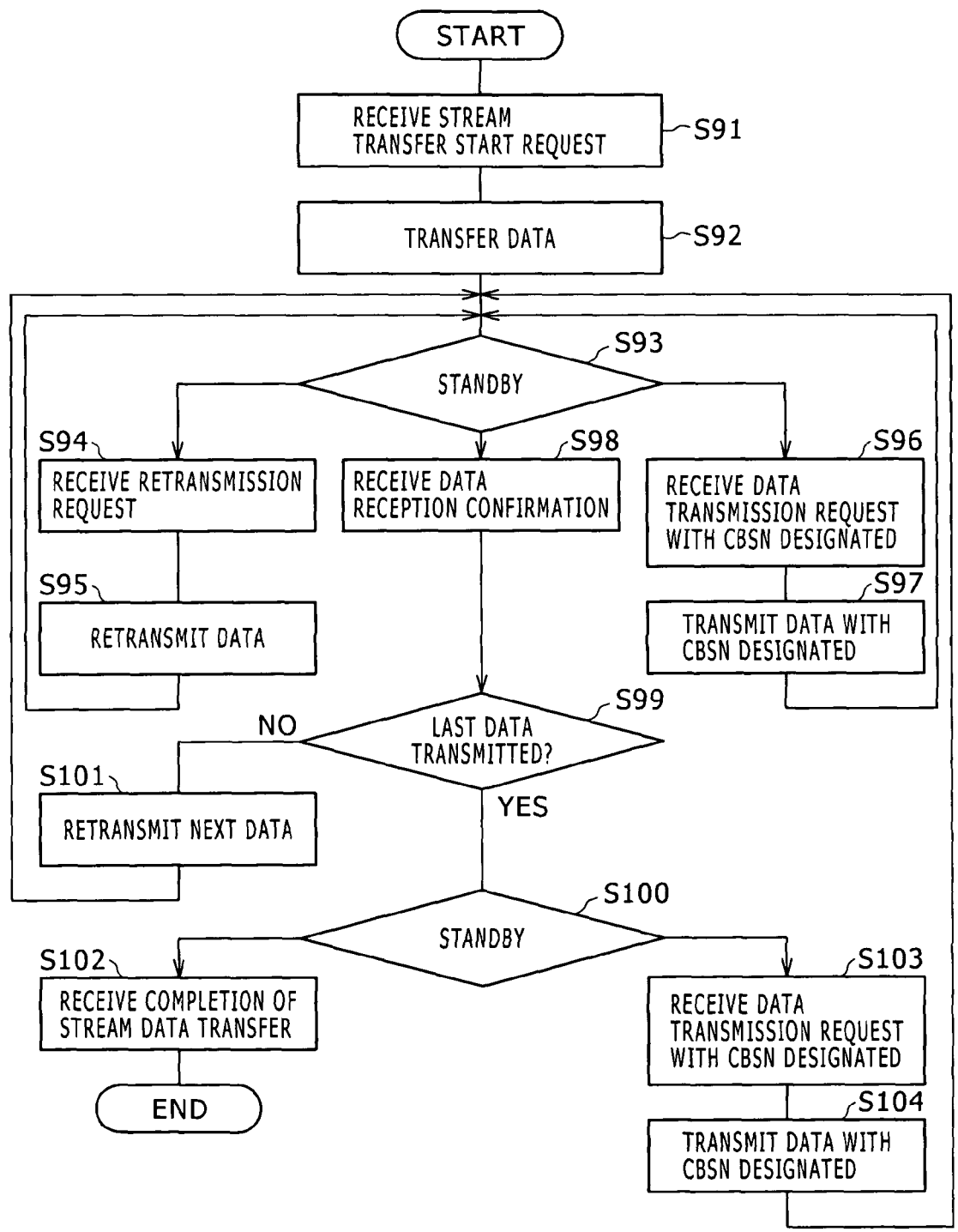
FIG. 11 is a flowchart of a control routine of the high bit rate contents data block delivery in the delivery unit of the contents delivery system according to the embodiment.

The flowchart shown in FIG. 11 represents the delivery process of the high bit rate contents data block performed by the delivery unit 1. Referring to the flowchart of FIG. 11, in response to the reception of the stream transfer start request from the mobile phone 6 in step S91, the delivery unit 1 transfers the first high bit rate contents data block to the mobile phone 6 in step S92. The process then proceeds to step S93 where the delivery unit 1 is brought into the standby state.

In response to the reception of the retransmission request from the mobile phone 6 in step S94, the delivery unit 1 in the standby state transfers the high bit rate contents data block designated with the block number corresponding to the retransmission request to the mobile phone 6 in step S95. The process returns to step S93 where the delivery unit 1 is brought into the standby state again.

The control unit 15 of the mobile phone 6 designates the block number (CBSN) of the contents data block that has been unreceived yet among the series of the contents data and transmits the transfer request to the delivery unit 1. In response to the reception of the transmission request of the contents data block designated with the block number (CBSN) from the mobile phone 6, the delivery unit 1 in the standby state in step S93 transmits the high bit rate contents data block with the designated block number to the mobile phone 6 in step S97. The process returns to step S93 where the process is brought into the standby state.

In response to the reception of the pre-data or the high bit rate contents data block, the control unit 15 of the mobile phone 6 transmits the data reception confirmation indicating the completion of receiving the delivery unit 1. In response to the data reception confirmation, the delivery unit 1 in the standby state in step S93 is allowed to execute the process in step S99.

In step S99, it is determined whether the data reception confirmation received by the delivery unit 1 from the mobile phone 6 accords with the transmission of the last contents data block of the series of contents data to the mobile phone 6. If the data reception confirmation from the mobile phone 6 does not correspond with the transmission of the last contents data block of the series of contents data to the mobile phone 6, the process proceeds to step S101 where the contents data block subsequent to the contents data block that has been already transmitted to the mobile phone 6 is retransmitted. The process returns to step S93 where the process is brought into the standby state.

If the data reception confirmation from the mobile phone 6 accords with the transmission of the last contents data block of the series of contents data to the mobile phone 6, the delivery unit 1 is allowed to execute the process in step S100 where the process is brought into the standby state.

In response to the completion of receiving the last contents data block of the series of the contents data, the control unit 15 of the mobile phone 6 transmits the stream transfer completion notification to the delivery unit 1, as step S28 in FIG. 6 shows. In the case where the unreceived contents data block exist upon completion of receiving the last contents data block of the series of the contents data, the control unit 15 of the mobile phone 6 designates the block number of the unreceived contents data block so as to transmit the retransmission request of the contents data block designated with the block number to the delivery unit 1.

In response to the reception of the retransmission request of the contents data block from the mobile phone 6 as step S103 shows, the delivery unit 1 in the standby state in step S100 retransmits the high bit rate contents data block with the designated block number to the mobile phone 6. The process returns to step S93 where the process is brought into the standby state.

In response to the reception of the stream transfer completion notification from the mobile phone 6 as step S102 shows, the delivery unit 1 in the standby state in step S100 terminates the series of the control process shown in the flowchart of FIG. 11 so as to indicate the completion of receiving the series of contents data.

[Pre-data Reception Performed by Mobile Phone]

Figure 12:
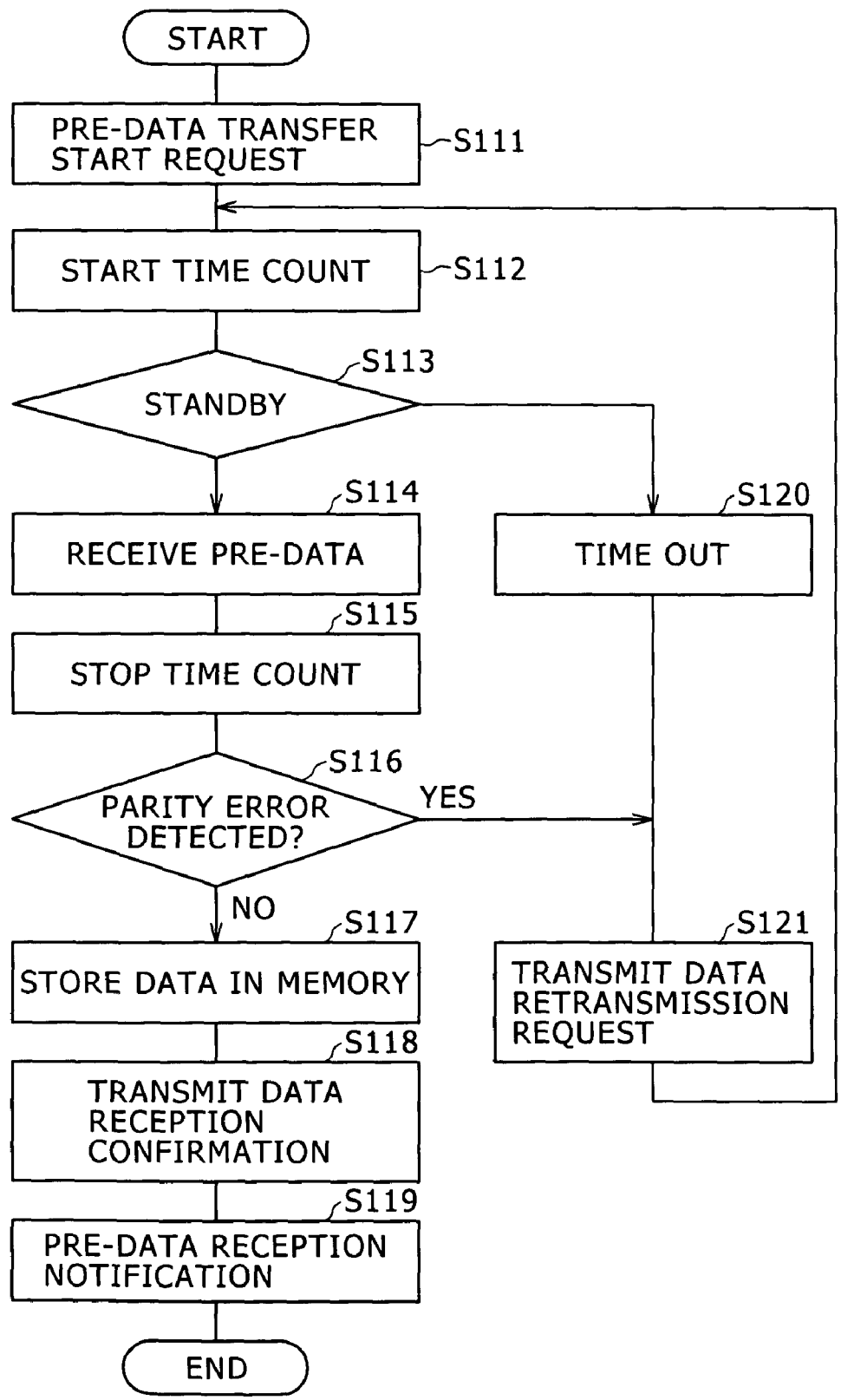
FIG. 12 is a flowchart of a control routine of a pre-data receiving operation in the mobile phone of the contents delivery system according to the embodiment.

The flowchart of FIG. 12 shows the pre-data reception process performed by the mobile phone 6. In step S111 of the flowchart, the control unit 15 of the mobile phone 6 transmits the transfer start request with respect to the pre-data as the low bit rate contents data to the delivery unit 1. In step S112, the control unit 15 allows the reproduction control timer to start time counting for executing the retransmission control of the pre-data. The process then proceeds to step S113 where the process is brought into the standby state.

If the retransmission control timer is brought into the time-out state in the standby state in step S113 without reception of the pre-data from the delivery unit 1, the control unit 15 of the mobile phone 6 proceeds to step S121 via step S120. The control unit 15 functions as the communication control unit 50 for downloading the pre-data again and transmits the pre-data retransmission request to the delivery unit 1. The process then returns to step S112 where the retransmission control timer is allowed to start time counting again. The process returns to step S113 where the process is brought into the standby state.

In response to the reception of the pre-data from the delivery unit 1, the control unit 15 functions as the communication control unit 50 to proceed the process to step S115 via step S114. In step S115, the control unit 15 interrupts the time count operation of the reproduction control timer for the pre-data reproduction.

The process proceeds to step S116 where the control unit 15 of the mobile phone 6 functions as the communication unit 50 to execute the parity check of the pre-data received from the delivery unit 1. If the parity error is detected, the process proceeds to step S121 where the pre-data transfer request is transmitted to the delivery unit 1 again.

If the pre-data have been normally received without causing the parity error, the process proceeds to step S117 where the control unit 15 functions as the communication control unit 50 to control such that the received pre-data are stored in the data storage portion 18. In step S118, the control unit 15 transmits the data reception confirmation indicating the completion of receiving the pre-data to the delivery unit 1. Then, in step S119, the control unit 15 functions as the application unit 51 to recognize the completion of receiving the pre-data. Thus, the process shown by the flowchart of FIG. 12 ends.

[High Bit Rate Contents Data Block Reception Performed by Mobile Phone]

Figure 13:
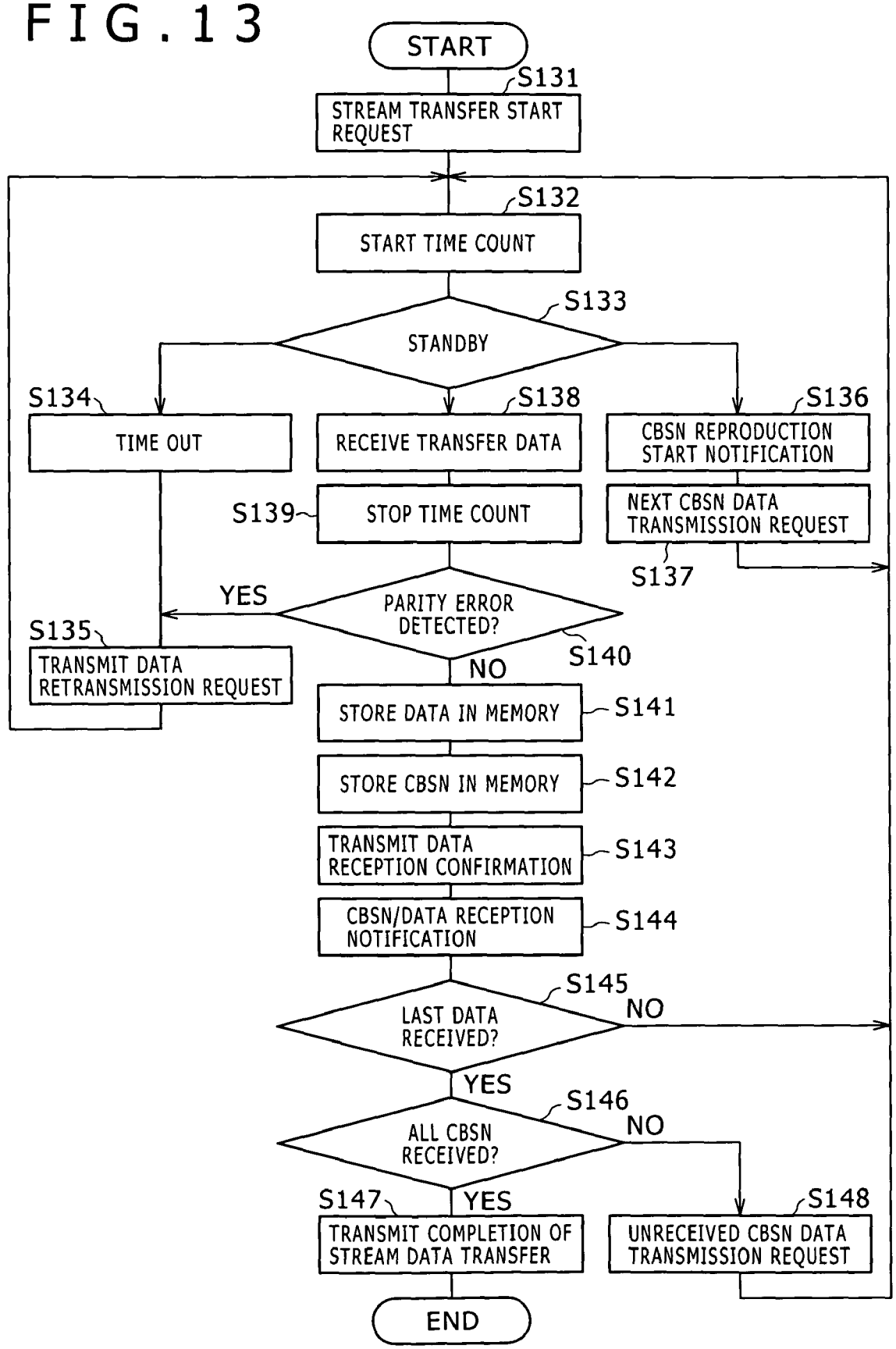
FIG. 13 is a flowchart of a control routine of the high bit rate contents data block receiving operation of the mobile phone in the contents delivery system according to the embodiment.

The flowchart of FIG. 13 shows the process of receiving the high bit rate contents data delivered from the delivery unit 1 executed by the mobile phone 6. In response to the completion of receiving the pre-data, the control unit 15 of the mobile phone 6 functions as the communication control unit 50 to transmit the stream transfer start request to the delivery unit 1, as step S131 of the flowchart shows. In step S132, the control unit 15 allows the reproduction control timer to start time counting, and in step S133, the process is brought into the standby state.

In the case where the retransmission control timer is brought into the time-out state, as step S134 shows, the control unit 15 in the standby state functions as the communication control unit 50 to transmit the retransmission of the contents data block which has caused the time-out (contents data block that cannot be normally received) in step S135. The process returns to step S132 where the retransmission control timer is allowed to start time counting with respect to the contents data block required to be retransmitted.

In response to the reception of the high bit rate contents data block from the delivery unit 1, as step S138 shows, the control unit 15 of the mobile phone 6 in the standby state interrupts the time count performed by the retransmission control timer in step S139. Then, in step S140, the parity check is executed with respect to the thus received high bit rate contents data block.

If the parity error is detected by the parity check, the control unit 15 functions as the communication control unit 50 to transmit the retransmission request of the contents data block detected as having the parity error to the delivery unit 1 in step S135. The process returns to step S132 where the retransmission control timer is allowed to start time counting with respect to the retransmission request of the subject contents data block.

If the high bit rate contents data block has been correctly received without causing the parity error, the control unit 15 functions as the communication control unit 50 to control such that the received contents data block is stored in the data storage portion 18 of the mobile phone 6 in step S141. Then, in step S142, the control unit 15 executes control such that the block number (CBSN information) of the received contents data block is stored in the data storage portion 18.

In step S143, the control unit 15 transmits the data reception confirmation indicating that the subject contents data block has been accurately received to the delivery unit 1. In step S144, the control unit 15 recognizes the completion of receiving the contents data block as well as the block number (CBSN) thereof.

In step S145, the control unit 15 determines whether the last contents data block of the series of stream data has been received. If the reception of the last contents data block has not been completed, the process returns to step S132 where the retransmission control timer is allowed to start time counting to control the reception of the last contents data block.

If the reception of the last contents data block has been completed, the process proceeds to step S146 where it is determined whether reception of all the contents data blocks that constitute the series of stream data has been completed based on the block numbers (CBSN information) stored in the data storage portion 18. If the unreceived contents data block is detected, the control unit 15 functions as the communication control unit 50 to transmit the block number of the unreceived contents data block to the delivery unit 1 and transmits the retransmission request of the unreceived contents data block to the delivery unit 1 in step S146. The process returns to step S132 where the retransmission control timer is allowed to start time counting to control the reception of the unreceived contents data block.

If the reception of all the contents data blocks that form the series of stream data has been completed, the control unit 15 functions as the communication control unit 50 to transmit the stream data transfer completion notification to the delivery unit 1 in step S147. Thus, the process of the flowchart shown in FIG. 13 ends.

In response to the completion of receiving the first high bit rate contents data block as described above, the control unit 15 of the mobile phone 6 starts reproduction from the first contents data block in the order of the block number. In the case where the reception of the high bit rate contents data block with the block number to be reproduced has not been completed, the low bit rate contents data block with the same block number among the pre-data will be reproduced in place of the high bit rate contents data block. The control unit 15 functions as the communication control unit 50 to recognize the block number of the reproduced low bit rate contents data block.

In the case where the control unit 15 in the standby state in step S133 recognizes the low bit rate contents data block that has been reproduced in place of the high bit rate contents data block, as step S136 shows, the process proceeds to step S137. In step S137, the control unit 15 functions as the communication control unit 50 to transmit the delivery request of the high bit rate contents data block with the block number next to that of the low bit rate contents data block to the delivery unit 1. The process then returns to step S132 where the retransmission control timer is allowed to start time counting to control the reception of the high bit rate contents data block with the next block number.

[Contents Reproduction Performed by Mobile Phone]

Figure 14:
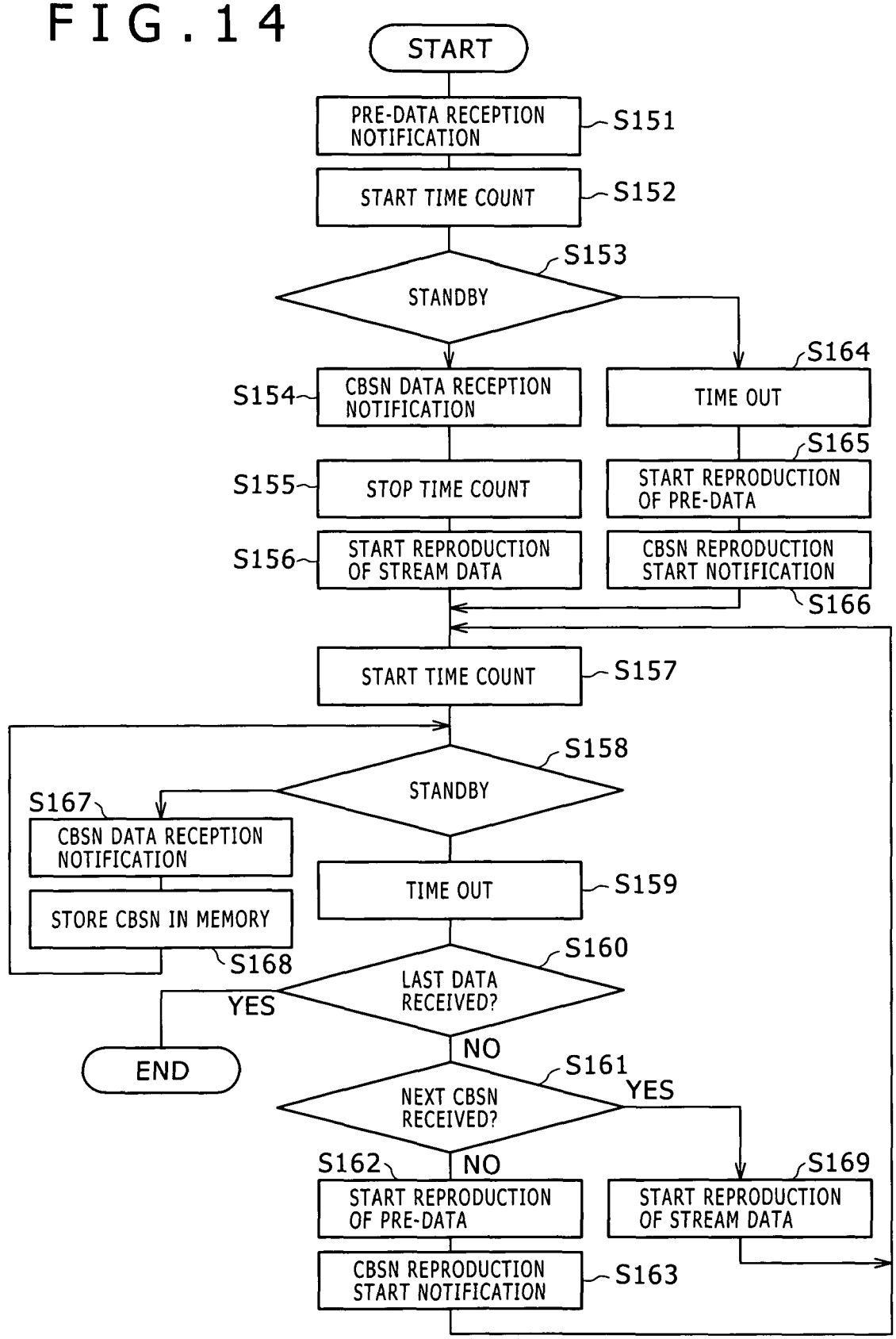
FIG. 14 is a flowchart of a control routine of the reproduction of the contents data block of the mobile phone in the contents delivery system according to the embodiment.

The flowchart of FIG. 14 shows the contents reproduction process performed by the mobile phone 6. Referring to the flowchart, when the completion of receiving the pre-data is recognized, as step S151 shows, the control unit 15 of the mobile phone 6 executes control such that the reproducing time control timer for the contents data block is allowed to start time counting in step S152. The process proceeds to step S153 where the process is brought into the standby state.

In the case where the completion of receiving the high bit rate contents data block is recognized before detection of the time-out state of the reproduction time control timer, as step S154 shows, the control unit 15 in the standby state functions as the application unit 51 to interrupt the timer counting performed by the reproduction time control timer in step S155. Then, in step S156, the control unit 15 starts reproduction of the high bit rate contents data block that has been already received. In step S157, the control is executed such that the reproduction time control timer for the subject contents data block is allowed to start time counting. The process proceeds to step S158 where the process is brought into the standby state.

In the case where the time-out state of the reproduction time control timer is detected, as step S164 shows in the standby state in step S153, the control unit 15 detects the low bit rate contents data block corresponding to the high bit rate contents data block that has not been received from the delivery unit 1 from the pre-data and starts reproduction of the detected low bit rate contents data block. Upon the start of reproduction, the control unit 15 functions as the communication control unit 50 in step S166 to recognize the block number of the reproduced low bit rate contents data block. In step S157, the control unit 15 executes control such that the reproduction time control timer is allowed to start time counting for the reproduced contents data block. The process proceeds to step S158 where the process is brought into the standby state.

With every reception of the high bit rate contents data block from the delivery unit 1, the mobile phone 6 transmits the data reception confirmation indicating the completion of receiving the contents data block to the delivery unit 1. Being triggered by the data reception confirmation, the delivery unit 1 transmits the high bit rate contents data blocks sequentially in the order of the block number. The control unit 15 of the mobile phone 6 recognizes the high bit rate contents data block received from the delivery unit 1. In the case where the control unit 15 in the standby state in step S158 recognizes the high bit rate contents data block received from the delivery unit 1, as step S167 shows, the control unit 15 functions as the application unit 51 to execute control such that the thus received high bit rate contents data block and the block number (CBSN information) thereof are stored in the data storage portion 18 in step S168. The process returns to step S158 where the process is brought into the standby state.

In the case where the time-out state of the reproduction time control timer for controlling the reproduction time of the contents data block that has been started is detected in step S159, the control unit 15 in the standby state in step S158 determines whether the reproduction of the last contents data block of the series of the stream data has been completed in step S160.

If the contents data block that causes the time-out state does not accord with the last contents data block of the series of the stream data, the process proceeds to step S161 where it is determined whether the reception of the high bit rate contents data block to be reproduced next has been completed.

If it is determined that the reception of the high bit rate contents data block to be reproduced next has been completed in step S161, the control unit 15 functions as the application unit 51 to start reproduction of the high bit rate contents data block that has been already received in step S169. Then, the process returns to step S157 where the reproduction time control timer for the high bit rate contents data block that has been started is allowed to start time counting. The process proceeds to step S158 where the process is brought into the standby state.

If it is determined that the reception of the high bit rate contents data block to be reproduced next has not been completed in step S161, the control unit 15 detects the low bit rate contents data block corresponding to the high bit rate contents data block that has been unreceived from the delivery unit 1 from the pre-data and starts reproducing the low bit rate contents data block. Upon the start of the reproduction, the control unit 15 functions as the communication control unit 50 to recognize the block number of the low bit rate contents data block that has been reproduced in step S163. The process returns to step S157 where the reproduction time control timer for the low bit rate contents data block that has been started is allowed to start time counting. The process proceeds to step S158 where the process is brought into the standby state.

If the contents data block that causes the time-out state in step S159 accords with the last contents data block of the series of the stream data, there may be no contents data block to be reproduced next. The control unit 15 functioning as the application unit 51 terminates the series of process shown by the flowchart of FIG. 14.

[Modification]

In the description of the embodiment, the contents delivery system performs the stream data delivery to the mobile phone. The system may be structured to perform the stream data delivery to other terminal devices, for example, a PHS (Personal Handyphone System), a PDA (Personal Digital Assistant), a note type PC, a desktop personal computer, which may provide the same effects as those obtained in the embodiment.

The aforementioned embodiment has been described as a mere example of the present invention, which is not limited thereto. It is to be understood by those skilled in the art that various modifications, combinations, sub-combinations and alterations may occur depending on design requirements and other factors insofar as they are within the scope of the appended claims or the equivalents thereof.

What is claimed is:

1. A mobile terminal unit comprising:
   a memory unit that stores low bit rate contents data to which a delivery source information indicating a delivery source address of high bit rate contents data with respect to predetermined contents is added, the low bit rate contents data containing contents corresponding to the predetermined contents of the high bit rate contents data;
   a delivery source address detection unit that detects the delivery source of the high bit rate contents data based on the delivery source information added to the low bit rate contents data stored in the memory unit for reproducing the predetermined contents;

a receiver unit that receives the high bit rate contents data from the delivery source address detected by the delivery source detection unit for reproducing the predetermined contents;

a reception state detection unit that detects a reception of the high bit rate contents data performed by the receiver unit; and a reproducing unit that reproduces the high bit rate contents data received by the receiver unit while the reception state detection unit detects the reception of the high bit rate contents data performed by the receiver unit, and reproduces the low bit rate contents data corresponding to the high bit rate contents data that have been unreceived from the low bit rate contents data stored in the memory unit while the reception state detection unit detects an unreceived state of the receiver unit with respect to the high bit rate contents data wherein the receiver unit acquires the delivery source address from the delivery source detection unit.

2. The mobile terminal unit according to claim 1, wherein:

each of the low bit rate contents data and the high bit rate contents data includes a plurality of contents data blocks obtained by dividing predetermined contents data; and a block number of the low bit rate contents data block is identical to that of the high bit rate contents data block if the low bit rate contents data block contains the same contents data as those of the high bit rate contents data block.

3. The mobile terminal unit according to claim 2, wherein:

the memory unit stores the high bit rate contents data block received by the receiver unit; and a deletion unit that deletes the high bit rate contents data block stored in the memory unit when reproduction of the predetermined contents by the reproduction unit is finished.

4. A contents delivery system comprising a mobile terminal unit that includes:

a contents delivery unit having a memory unit that stores high bit rate contents data with respect to predetermined contents, and a delivery unit that delivers the high bit rate contents data that have been read from the memory unit in response to a delivery request of the predetermined contents;

a memory unit that stores the low bit rate contents data with respect to the predetermined contents, to which delivery source address information indicating that a delivery source of the high bit rate contents data with respect to the predetermined contents is the contents delivery unit is added;

a delivery source address detection unit that detects the delivery source of the high bit rate contents data based on the delivery source information added to the low bit rate contents data stored in the memory unit for reproducing the predetermined contents;

a receiver unit that receives the high bit rate contents data from the contents delivery unit at the delivery source address detected by the delivery source detection unit for reproducing the predetermined contents;

a receiver state detection unit that detects a reception of the high bit rate contents data performed by the receiver unit; and a reproducing unit that reproduces the high bit rate contents data received by the receiver unit while the reception state detection unit detects a reception of the high bit rate contents data performed by the receiver unit, and reproduces the low bit rate contents data corresponding to the high bit rate contents data that have been unreceived from the low bit rate contents data stored in the memory unit while the reception state detection unit detects an unreceived state of the receiver unit with respect to the high bit rate contents data wherein the receiver unit acquires the delivery source address from the delivery source detection unit.

5. The contents delivery system according to claim 4, wherein:

each of the low bit rate contents data and the high bit rate contents data includes a plurality of contents data blocks obtained by dividing predetermined contents data; and a block number of the low bit rate contents data block is identical to that of the high bit rate contents data block if the low bit rate contents data block contains the same contents data as those of the high bit rate contents data block.

6. A computer program product comprising a non-transitory computer readable medium including program code stored thereon, said program code being executable to perform operations comprising:

detecting, by a delivery source address diction unit, a delivery source of high bit rate contents data with respect to predetermined contents to be reproduced from a memory unit which stores low bit rate contents data with respect to the predetermined contents to which delivery source information indicating the delivery source address of the high bit rate contents data with respect to the predetermined contents is added based on the delivery source information added to the low bit rate contents data;

receiving, by a receiving unit, the high bit rate contents data from the delivery source address detected by the delivery source detection unit to reproduce the predetermined contents; and reproducing the high bit rate contents data received by the receiver unit while a reception state detection unit detects a reception of the high bit rate contents data, and reproducing the low bit rate contents data corresponding to the high bit rate contents data that have been unreceived from the low bit rate contents data stored in the memory unit while the reception state detection unit detects an unreceived state of the receiver unit with respect to the high bit rate contents data wherein the receiver unit acquires the delivery source address from the delivery source detection unit.

* * * * *